(No Model.)
J. L. O'CONNOR.
COPYING BOOK.
No. 266,189. Patented Oct. 17, 1882.
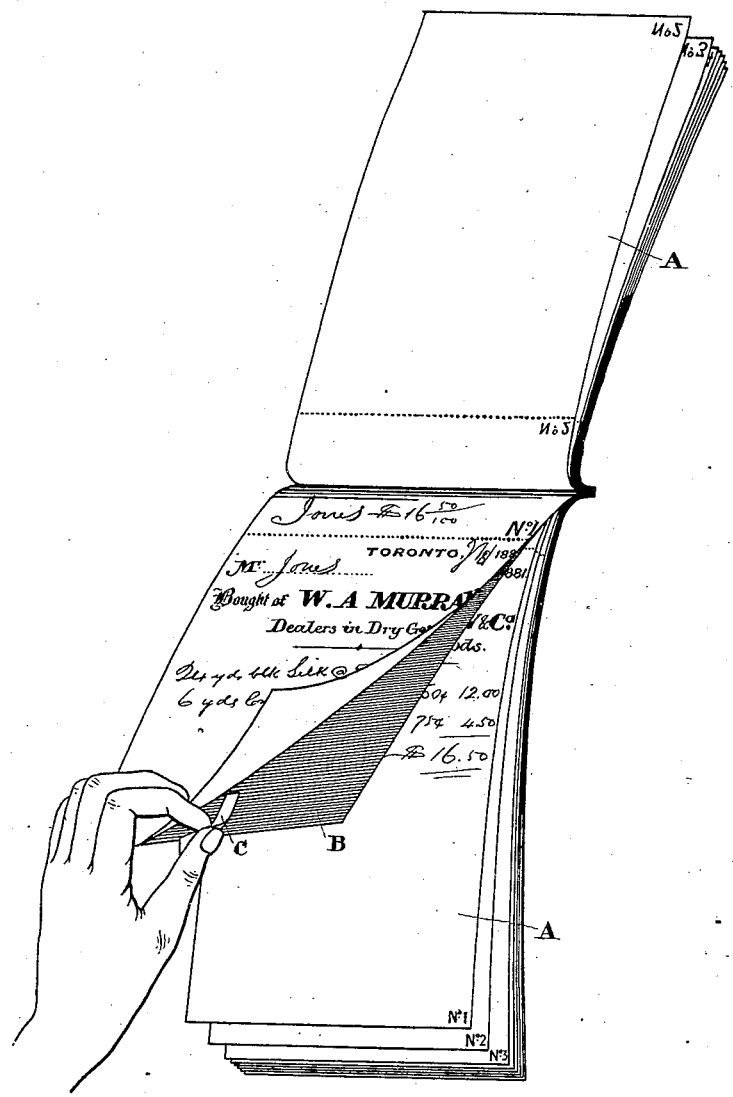
Witnesses.
Inventor.

UNITED STATES PATENT OFFICE.

JAMES L. O'CONNOR, OF TORONTO, ONTARIO, CANADA.

COPYING-BOOK.

SPECIFICATION forming part of Letters Patent No. 266,189, dated October 17, 1882.

Application filed October 15, 1881. (No model.)

*To all whom it may concern:*

Be it known that I, JAMES LANDRIGAN O'CONNOR, of the city of Toronto, in the county of York, in the Province of Ontario, Canada, have invented certain new and useful Improvements in Copying-Books, of which the following is a specification.

The invention relates to that class of copying-books in which a black leaf is utilized for the purpose of simultaneously transposing the original writing onto a duplicate sheet.

The object of the invention is to so arrange and make the book that the same black leaf can be utilized for all the sheets of paper in the book without requiring the said black sheet to be moved from its original position; and it consists mainly in binding the book with a black leaf placed in its center.

The drawing is a perspective view of a book with the leaf upon which the original writing has been made lifted up, and also the black leaf, so as to show the duplicate writing below.

As shown by the drawing, the book consists of a number of leaves, A, bound together and perforated near the stub, so that each leaf can be easily removed, leaving the stub sufficiently wide to make any entry to indicate the nature of the writing upon the leaf removed from it.

B is a black leaf, provided with a tag, C, which tag enables the black leaf to be raised without handling it when it is desired.

The drawing represents clearly the operation of the invention. The hand is represented as seizing the tag attached to the black leaf B, while the top blank sheet is slightly turned up to show the black leaf. The writing written upon this upper sheet is by the action of the black sheet copied through upon the leaf marked "No. 1," on the other side of the black leaf. In this manner a duplicate invoice is obtained. The clerk writing upon the one sheet obtains a copy of what he has written upon the sheet on the other side of the black leaf, which he tears off, handing one sheet to the customer and the other to the book-keeper or other party who is to receive it. The book is thus ready for the next invoice without moving the black leaf, which is permanently attached to the book, and will remain good until all the leaves in the book have been used.

What I claim as my invention is—

1. A copying check-book having a black impression-leaf, B, bound substantially in the center of the book, substantially as and for the purpose set forth.

2. A copying check-book having a black impression-leaf, B, bound substantially in the center of the book, with the leaves numbered consecutively and correspondingly from either side of the black leaf, substantially as described.

J. L. O'CONNOR.

Witnesses:
C. W. BALDWIN,
H. H. WARREN.